H. A. LAYCOCK.
REGULATOR.
APPLICATION FILED OCT. 27, 1913.
1,216,236.
Patented Feb. 13, 1917.
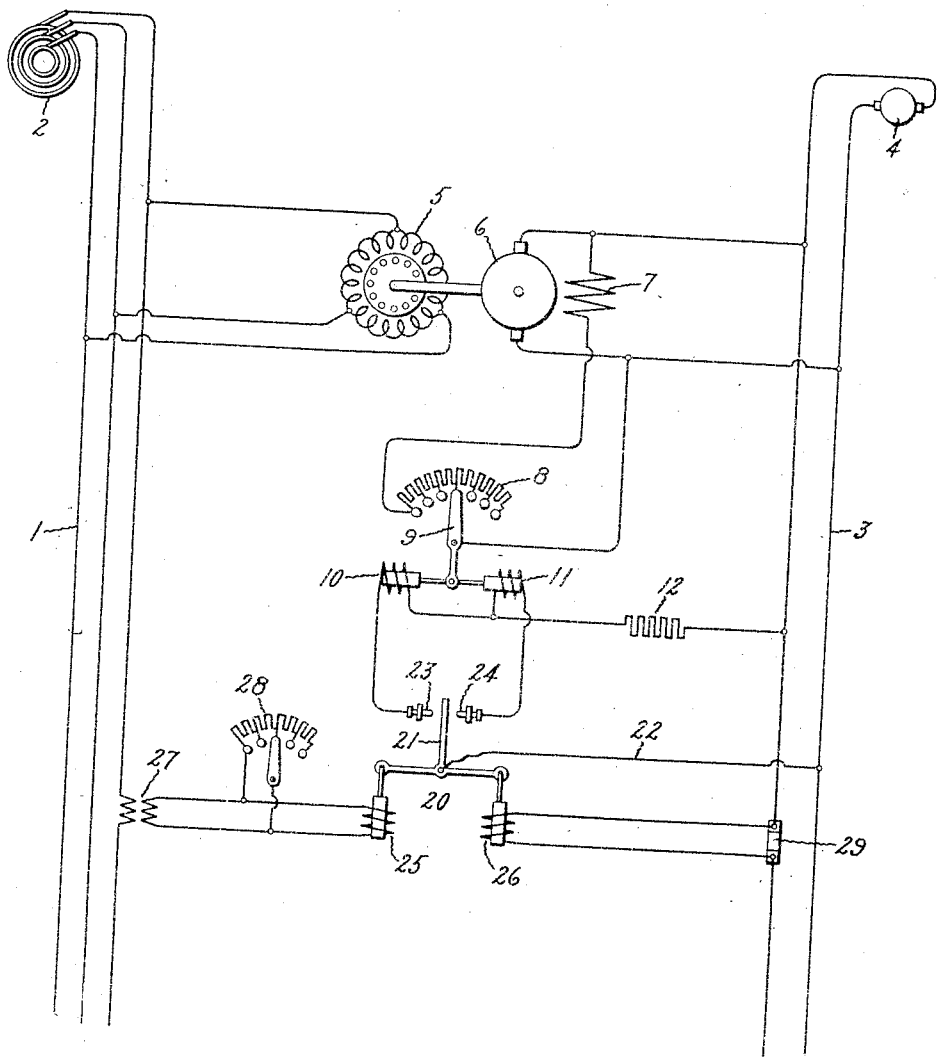
WITNESSES:
J. Earl Ryan
J. Ellis Elen
INVENTOR:
HARRY A. LAYCOCK
BY
His Attorney.

UNITED STATES PATENT OFFICE.

HARRY A. LAYCOCK, OF SCHENECTADY, NEW YORK, ASSIGNOR TO GENERAL ELECTRIC COMPANY, A CORPORATION OF NEW YORK.

REGULATOR.

1,216,236.   Specification of Letters Patent.   Patented Feb. 13, 1917.

Application filed October 27, 1913. Serial No. 797,614.

*To all whom it may concern:*

Be it known that I, HARRY A. LAYCOCK, a citizen of the United States, residing at Schenectady, in the county of Schenectady, State of New York, have invented certain new and useful Improvements in Regulators, of which the following is a specification.

My invention relates to regulators for transforming apparatus which effect an interchange of energy between two electrical systems.

Wherever an alternating current system and a direct current system are interconnected by means of a transforming apparatus, such as a rotary converter or a motor generator set, it is customary to provide some sort of regulator in order that there may be an equal distribution of load between the two systems. This regulator may be manual or automatic. If automatic, it may be responsive to various conditions in the two systems.

The object of my invention is to provide an improved form of automatic regulator for use in connection with a transforming apparatus connected between an alternating current and a direct current system. In my invention I provide a single regulating device responsive to changes of load in the two systems and apply it to vary the field excitation of the transforming apparatus.

I have shown my regulator as applied to a motor generator set comprising an induction motor and a direct current dynamo. Whenever the speed of this set exceeds the synchronous speed of the induction motor it is obvious that the latter will act as an induction generator and be driven by the direct current machine. For varying the field excitation of the direct current machine and hence the speed of the set, 1 introduce an electrically operated rheostat in the field circuit. I control this rheostat by means of a floating contact which is oscillated in opposite directions by solenoids whose strength is dependent on the load on the respective systems.

My invention will be more clearly understood from an inspection of the accompanying drawing in which the single figure is a diagrammatic view showing the application of my invention.

In the drawing I have indicated an alternating current system 1 supplied by a generator 2 and a direct current system 3 supplied by a generator 4. Although I have shown the alternating current system as three phase, this is only for the purpose of description, and my invention could be as well applied to an alternating current system of any phase. Connected to the alternating current system is an induction motor 5 mounted on the same shaft with a direct current machine 6 which is in turn connected to the direct current system. This device, then, constitutes a rotary transforming apparatus which is essentially a motor generator set having an alternating current element and a direct current element, either of which may drive the other. The direct current element is provided with a shunt field 7, in series with which is an electrically operated rheostat 8.

This rheostat comprises the ordinary series of resistance elements connected to contact points, and a pivoted contact arm 9 passing over these contact points. For the actuation of this contact arm, I provide two solenoids 10 and 11 whose cores are connected rigidly together and pivotally connected to the lower end of the contact arm. These solenoids are wound to act in opposite directions and their common terminal is connected through a resistance 12 to one side of the direct current system. This resistance 12 merely serves to decrease the current in the solenoids.

For energizing the rheostat I provide a contactor 20 consisting of a balanced contact arm 21 which is connected to the other side of the direct current system by means of the connection 22, and which oscillates between the fixed contact points 23 and 24. Contact point 23 is connected to the solenoid 10, while point 24 is connected to the solenoid 11. To the outer ends of the balanced contact arm I pivotally connect the cores of solenoids 25 and 26. Solenoid 25 is energized from the current transformer 27 connected to one phase of the alternating current system. The rheostat 28 is bridged across the solenoid circuit for the regulation of the current supplied thereto. The solenoid 26 is connected to opposite sides of a shunt 29 in the direct current system.

The operation of my device will be as follows: Let us suppose that the load on the alternating current system is greater than on the direct current system. If the device is properly adjusted, the solenoid 25 will then overpower the solenoid 26, causing the contact arm 21 to touch the point 23, thereby energizing the solenoid 10. This will result in moving the contact arm 9 so as to increase the resistance in series with the field. This increase in resistance will result in the decrease of excitation of the field of the direct current element and cause a consequent increase in the speed of the motor generator set. Such increase in speed will tend to drive the alternating current element 5 as an induction generator, and thereby supply energy to the alternating current system. It will thus be seen that the desired result has been accomplished, namely, of taking energy from the direct current system which has the lighter load and supplying it to the alternating current system which has the heavier load.

In case the conditions are reversed and the load on the direct current system is heavy, the reverse series of operations will occur. In this case the solenoid 26 overpowers the solenoid 25 and contact arm 21 moves so as to energize the solenoid 11 and thereby decrease the resistance inserted in the shunt field. This will result in slowing down the motor generator set and when its speed has fallen below the synchronous speed of the alternating current element, the latter will act as a motor and drive the direct current element as a generator. This will supply energy to the direct current system and take it from the alternating current system.

It will thus be seen that my device constitutes a single means controlled by the ratio of the loads on the respective systems, which in turn controls the direction of the interchange of energy between the two systems.

While I have shown herein the preferred embodiment of my invention, I conceive that various modifications might be made therein and I do not desire to be limited to the specific construction herein shown, but seek to cover in the appended claims those modifications which come within the scope and spirit of my invention.

What I claim as new and desire to secure by Letters Patent of the United States, is:—

1. In combination, an alternating current system, a direct current system, means for effecting an inter-change of energy between the two systems in either direction, and a single means controlled by the ratio of the loads on the two systems to control the direction of interchange of energy.

2. In combination, an alternating current system, a direct current system, means for effecting an interchange of energy in either direction between the two systems including a magnetic field, and a single means controlled by the ratio of the loads on the two systems to control the field of said first named means.

3. An alternating current circuit and its source, a direct current circuit and its source, rotary transforming apparatus for transferring energy between the circuits, means for exciting said transforming apparatus and a single means controlled by the currents in said circuits to control the excitation of said transforming apparatus.

4. An alternating current circuit and its source, a direct current circuit and its source, rotary transforming apparatus for transferring energy between the circuits, a field winding for exciting said apparatus, a resistance in series therewith, and a single means controlled by the currents in said circuits to add resistance to or subtract resistance from the circuit of the field winding of said apparatus.

5. In combination, an alternating current system, a direct current system, a reversible motor generator set comprising an alternating current element and a direct current element connected between said systems, a field winding for one of said elements, a resistance in series therewith, and solenoids responsive to changes in current in the respective systems controlling said resistance.

6. In combination, an alternating current system, a direct current system, a reversible motor generator set comprising an alternating current element and a direct current element connected between said systems, a field winding on said direct current element, a resistance in series therewith, and solenoids responsive to changes in currents in the respective circuits controlling the resistance in the field of the direct current element.

7. In combination, an alternating current system, a direct current system, a transforming apparatus for transferring energy between said systems, a field winding for said apparatus, and a device for controlling the current in the field of said transforming apparatus comprising two solenoids controlled by the load on the respective systems, a contactor actuated in opposite directions by said solenoids, and an electrically operated rheostat in said field circuit energized through said contactor.

8. In combination, an alternating current system, a direct current system, a transforming apparatus transferring energy between said systems, a field winding for said apparatus, and a device for controlling the current in the field winding of said transforming apparatus comprising two solenoids controlled by the load on the respective systems, fixed contact points, a balanced contact arm floating between said fixed points, and actuated by said solenoids, and an electrically operated rheostat in said field circuit adapted to be operated in opposite directions upon the contact by the said arm with the respective points.

In witness whereof, I have hereunto set my hand this 25th day of October 1913.

HARRY A. LAYCOCK.

Witnesses:
MARGARET AR. DELEHANTY,
HELEN ORFORD.